United States Patent
Bedy et al.

(10) Patent No.: US 10,664,285 B1
(45) Date of Patent: May 26, 2020

(54) FLEXIBLY DERIVING INTENDED THREAD DATA EXCHANGE PATTERNS

(71) Applicant: ADVANCED MICRO DEVICES, INC., Santa Clara, CA (US)

(72) Inventors: Michael John Bedy, Boxborough, MA (US); Eric J. Finger, Westlake Village, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/226,411

(22) Filed: Dec. 19, 2018

(51) Int. Cl.
*G06F 9/38* (2018.01)
*G06F 9/50* (2006.01)
*G06F 9/48* (2006.01)

(52) U.S. Cl.
CPC ......... *G06F 9/3881* (2013.01); *G06F 9/3887* (2013.01); *G06F 9/4881* (2013.01); *G06F 9/5033* (2013.01); *G06F 9/5038* (2013.01)

(58) Field of Classification Search
None
See application file for complete search history.

(56) References Cited

U.S. PATENT DOCUMENTS

2016/0283549 A1\* 9/2016 Hux .................... G06F 9/30021
2018/0300139 A1\* 10/2018 Que .......................... G06T 1/20

\* cited by examiner

*Primary Examiner* — Yanna Wu (57) ABSTRACT

A method of deriving intended thread data exchange patterns from source code includes identifying, based on a constant array, a pattern of data exchange between a plurality of threads in a wavefront. The constant array includes an array of source lane values identifying a thread location within the wavefront to read from for performing the pattern of data exchange. The pattern of data exchange is identified as a hardware-accelerated exchange pattern based on the constant array.

20 Claims, 5 Drawing Sheets

FLEXIBLY DERIVING INTENDED THREAD DATA EXCHANGE PATTERNS

BACKGROUND

High-performance processing systems include multiple processing units and memory systems. Multi-threaded processing units (such as a graphics processing unit, GPU) typically implement multiple processing cores (referred to as "compute units") that process multiple operations and request access to memory systems concurrently through multiple memory channels. In many applications, such as graphics processing in a GPU, a sequence of work-items (which can also be referred to as threads) are processed in order to output a final result.

During processing, the multiple processor cores are able to execute a thread concurrently with execution of other threads by the other compute units, e.g., according to the single instruction, multiple data (SIMD) execution model. Processing systems cluster threads into wavefronts, or warps, that concurrently execute the same instruction on different data. As the waves execute, instructions or data are retrieved from memory to be used by the processing elements. Execution of a wavefront terminates when all threads within the wavefront complete processing.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Multithreading is used to leverage the parallel or concurrent processing power of processing units in a multiprocessor system. Each processing unit is able to execute a thread concurrently with execution of other threads by the other processing units, e.g., according to the single-instruction, multiple-data (SIMD) execution model. Processing system hardware clusters threads into wavefronts that concurrently execute the same instruction on different data. In some cases, programmers cluster multiple wavefronts into a workgroup or thread block.

FIGS. 1-5 disclose systems and techniques to improve intra-wavefront data exchange for sharing data between threads that are part of the same wavefront by determining what pattern of data exchange is represented before matching with available hardware-accelerated exchange patterns for a particular processing devices, such as GPUs or accelerated processing devices (APDs). This avoids analyzing source code text for specific code patterns to identify an intended intra-wave data exchange pattern and/or relying on explicitly defined intrinsic functions for intra-wave data exchange. In some embodiments, a method of deriving intended thread data exchange patterns from source code includes identifying, based on a constant array, a pattern of data exchange between a plurality of threads in a wavefront. In various embodiments, the constant array includes an array of source lane values identifying a thread location within the wavefront to read from for performing the pattern of data exchange. The pattern of data exchange is identified as a hardware-accelerated exchange pattern based on the constant array. Further, a set of executable instructions to perform the hardware-accelerated exchange pattern is generated.

Figure 1:
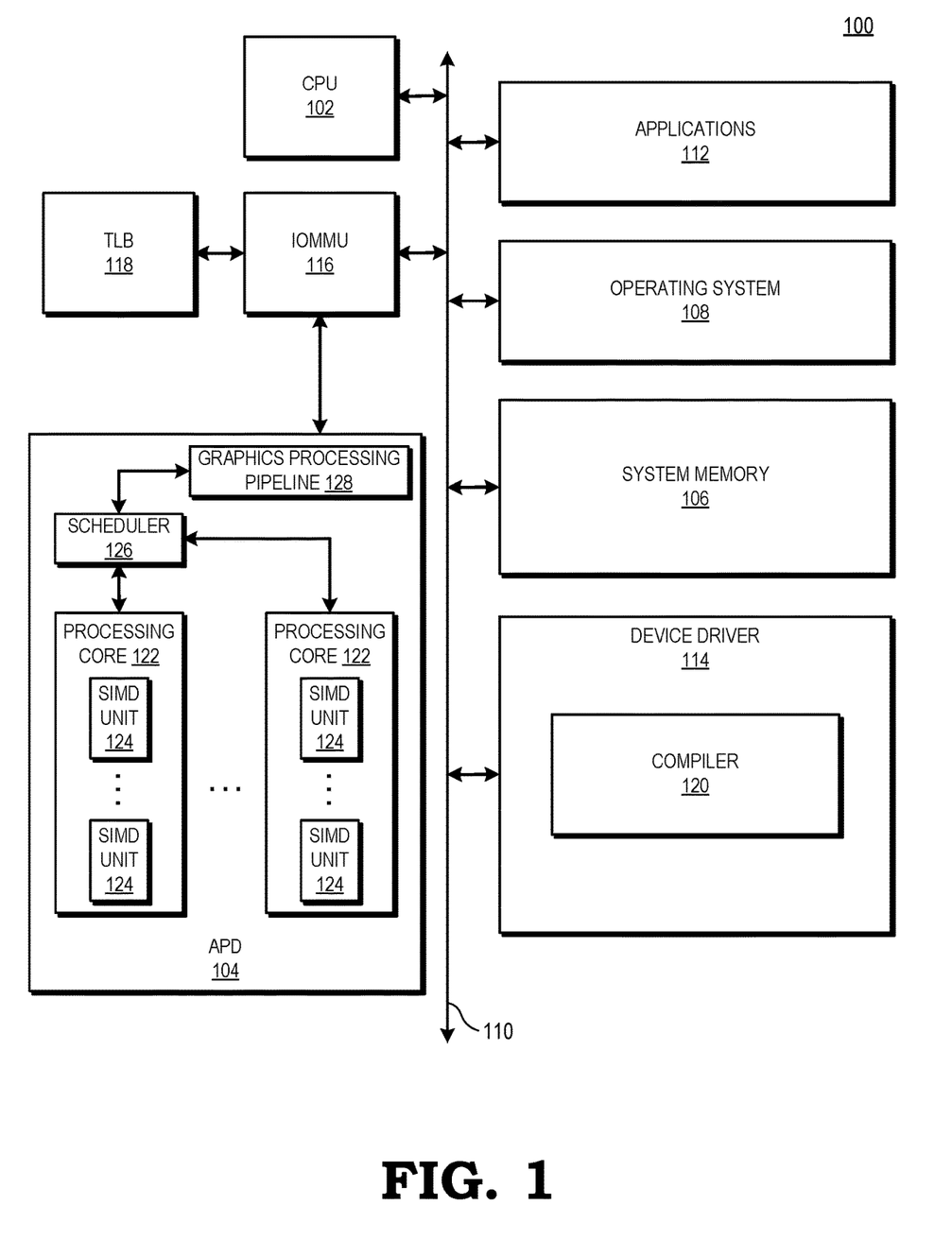
FIG. 1 is a block diagram of a processing system in accordance with some embodiments.

FIG. 1 is a block diagram of a processing system 100 in accordance with some embodiments. The processing system 100 includes a central processing unit (CPU) 102 and an accelerated processing device (APD) 104. In various embodiments, the CPU 102 includes one or more single- or multi-core CPUs. In various embodiments, the APD 104 includes any cooperating collection of hardware and/or software that perform functions and computations associated with accelerating graphics processing tasks, data parallel tasks, nested data parallel tasks in an accelerated manner with respect to resources such as conventional CPUs, conventional graphics processing units (GPUs), and combinations thereof. Although GPUs, accelerated processing units (APUs), and general purpose use of the graphics processing unit (GPGPU) are commonly used terms in this field, the expression "accelerated processing device (APD)" as used herein is a broader expression. In the embodiment of FIG. 1, the processing system 100 is formed on a single silicon die or package that combines the CPU 102 and the APD 104 to provide a unified programming and execution environment. This environment enables the APD 104 to be used as fluidly as the CPU 102 for some programming tasks. In other embodiments, the CPU 102 and the APD 104 are formed separately and mounted on the same or different substrates. It should be appreciated that processing system 100 may include more or fewer components than illustrated in FIG. 1. For example, processing system 100 may additionally include one or more input interfaces, non-volatile storage, one or more output interfaces, network interfaces, and one or more displays or display interfaces.

As illustrated in FIG. 1, the processing system 100 also includes a system memory 106, an operating system 108, a communications infrastructure 110, and one or more applications 112. Access to system memory 106 is managed by a memory controller (not shown), which is coupled to memory 106. For example, requests from the CPU 102 or other devices for reading from or for writing to system memory 106 are managed by the memory controller. In some embodiments, the one or more applications 112 include various programs or commands to perform computations that are also executed at the CPU 102. The CPU 102 sends selected commands for processing at the APD 104. The operating system 108 and the communications infrastructure 110 are discussed in greater detail below. The processing system 100 further includes a device driver 114 and a memory management unit, such as an input/output memory management unit (IOMMU) 116. Components of processing system 100 may be implemented as hardware, firmware, software, or any combination thereof. In some embodiments the processing system 100 includes one or more software, hardware, and firmware components in addition to or different from those shown in FIG. 1.

Within the processing system 100, the system memory 106 includes non-persistent memory, such as DRAM (not shown). In various embodiments, the system memory 106 stores processing logic instructions, constant values, variable values during execution of portions of applications or other processing logic, or other desired information. For example, parts of control logic to perform one or more operations on CPU 102 may reside within system memory 106 during execution of the respective portions of the operation by CPU 102. During execution, respective applications, operating system functions, processing logic commands, and system software reside in system memory 106. Control logic commands that are fundamental to operating system 108 generally reside in system memory 106 during execution. In some embodiments, other software commands (e.g., device driver 114) also reside in system memory 106 during execution of processing system 100.

The IOMMU 116 is a multi-context memory management unit. As used herein, context is considered the environment within which the kernels execute and the domain in which synchronization and memory management is defined. The context includes a set of devices, the memory accessible to those devices, the corresponding memory properties, and one or more command-queues used to schedule execution of a kernel(s) or operations on memory objects. The IOMMU 116 includes logic to perform virtual to physical address translation for memory page access for devices, such as the APD 104. In some embodiments, the IOMMU 116 also includes, or has access to, a translation lookaside buffer (TLB) 118. The TLB 118, as an example, is implemented in a content addressable memory (CAM) to accelerate translation of logical (i.e., virtual) memory addresses to physical memory addresses for requests made by the APD 104 for data in system memory 106.

In various embodiments, the communications infrastructure 110 interconnects the components of processing system 100. Communications infrastructure 110 includes (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. In some embodiments, communications infrastructure 110 also includes an Ethernet network or any other suitable physical communications infrastructure that satisfies an application's data transfer rate requirements. Communications infrastructure 110 also includes the functionality to interconnect components, including components of processing system 100.

A driver, such as device driver 114, communicates with a device (e.g., APD 104) through an interconnect or the communications infrastructure 110. When a calling program invokes a routine in the device driver 114, the device driver 114 issues commands to the device. Once the device sends data back to the driver device 114, the device driver 114 invoke routines in an original calling program. In general, device drivers are hardware-dependent and operating-system-specific to provide interrupt handling required for any necessary asynchronous time-dependent hardware interface. In some embodiments, a compiler 120 is embedded within device driver 114. The compiler 120 compiles source code into program instructions as needed for execution by the processing system 100. During such compilation, the compiler 120 may apply transforms to program instructions at various phases of compilation. In other embodiments, the compiler 120 is a stand-alone application.

The CPU 102 includes (not shown) one or more of a control processor, field programmable gate array (FPGA), application specific integrated circuit (ASIC), or digital signal processor (DSP). The CPU 102 executes at least a portion of the control logic that controls the operation of the processing system 100. For example, in various embodiments, the CPU 102 executes the operating system 108, the one or more applications 112, and the device driver 114. In some embodiments, the CPU 102 initiates and controls the execution of the one or more applications 112 by distributing the processing associated with one or more applications 112 across the CPU 102 and other processing resources, such as the APD 104.

The APD 104 executes commands and programs for selected functions, such as graphics operations and other operations that may be particularly suited for parallel processing. In general, APD 104 is frequently used for executing graphics pipeline operations, such as pixel operations, geometric computations, and rendering an image to a display. In some embodiments, APD 104 also executes compute processing operations (e.g., those operations unrelated to graphics such as video operations, physics simulations, computational fluid dynamics, etc.), based on commands or instructions received from the CPU 102. For example, commands may be considered special instructions that are not typically defined in the instruction set architecture (ISA) of the APD 104. A command may be executed by a special processor, such a dispatch processor, command processor, or network controller.

In various embodiments, the APD 104 includes one or more compute units, such as one or more processing cores 122 that include one or more SIMD units 124 that executes a thread concurrently with execution of other threads in a wavefront, e.g., according to a single-instruction, multiple-data (SIMD) execution model. The SIMD execution model is one in which multiple processing elements share a single program control flow unit and program counter and thus execute the same program but are able to execute that program with different data. Some embodiments of the APD 104 are used to implement a GPU and, in that case, the processing cores 122 are referred to as shader cores or streaming multi-processors (SMXs). The number of processing cores 122 that are implemented in the APD 104 is a matter of design choice.

Each of the one or more processing cores 122 executes a respective instantiation of a particular work-item to process incoming data, where the basic unit of execution in the one or more processing cores 122 is a work-item (e.g., a thread). Each work-item represents a single instantiation of, for example, a collection of parallel executions of a kernel invoked on a device by a command that is to be executed in parallel. A work-item may be executed by one or more processing elements as part of a work-group executing at a processing core 122.

The APD 104 includes GPUs that issue and execute work-items including groups of threads executed simultaneously as a "wavefront" on a single SIMD unit 124. Multiple wavefronts are included in a "work group," which includes a collection of work-items designated to execute the same program. A work group is executed by executing each of the wavefronts that make up the work group. In some embodiments, the wavefronts are executed sequentially on a single SIMD unit 124 or partially or fully in parallel on different SIMD units. In other embodiments, all wavefronts from a workgroup are processed at the same processing core 122. Wavefronts may also be interchangeably referred to as warps, vectors, or threads. In some embodiments, wavefronts include instances of parallel execution of a shader program, where each wavefront includes multiple work-items that execute simultaneously on a single SIMD unit 124 in line with the SIMD paradigm (e.g., one instruction control unit executing the same stream of instructions with multiple data). A scheduler 126 performs operations related to scheduling various wavefronts on different processing cores 122 and SIMD units 124, as well as performing other operations for orchestrating various tasks on the APD 104.

The parallelism afforded by the one or more processing cores 122 is suitable for graphics related operations such as pixel value calculations, vertex transformations, tessellation, geometry shading operations, and other graphics operations. A graphics processing pipeline 128 accepts graphics processing commands from the CPU 102 and thus provides computation tasks to the one or more processing cores 122 for execution in parallel. Some graphics pipeline operations, such as pixel processing and other parallel computation operations, require that the same command stream or compute kernel be performed on streams or collections of input data elements. Respective instantiations of the same compute kernel are executed concurrently on multiple SIMD 124 units in the one or more processing cores 122 in order to process such data elements in parallel. As referred to herein, for example, a compute kernel is a function containing instructions declared in a program and executed on an APD processing core 122. This function is also referred to as a kernel, a shader, a shader program, or a program.

The width of a wavefront is a characteristic of the hardware of SIMD units 124 of the APD 104. In various embodiments, the APD 104 includes GPU architecture that issues wavefronts of a constant, fixed size that depends on the GPU hardware's microarchitecture. Each processing core 122 includes one or more processing elements such as scalar and/or vector floating-point units, arithmetic and logic units (ALUs), and the like. In various embodiments, the processing cores 122 also include special purpose processing units (not shown), such as inverse-square root units and sine/cosine units.

A work-item (e.g., thread) in a wavefront executes on a SIMD hardware lane (hereinafter referred to as a "SIMD lane") during its execution. In one embodiment, the processing elements of each SIMD unit 124 are arranged into arrays that each includes sixteen lanes, where each lane executes the same instruction at the same time as the other lanes in the SIMD unit 124 but can execute that instruction with different data and with each work-item mapped to a lane during execution. In some embodiments, a wavefront is a group of sixty-four threads (and thus each thread of the wavefront is assigned to a lane ranging from 0 to 63), which are issued in groups of sixteen threads through a sixteen-lane-wide SIMD unit over four cycles. However, those skilled in the art will recognize that the width of wavefronts and SIMD units 124 may include any configuration or number of threads (e.g., 8, 16, 32, 64, and the like) without departing from the scope of this disclosure.

To reduce latency associated with off-chip memory access, various APD architectures include a memory cache hierarchy (not shown) including, for example, L1 cache and a local data share (LDS). The LDS is a high-speed, low-latency memory private to each processing core 122. In some embodiments, the LDS is a full gather/scatter model so that a work-group writes anywhere in an allocated space.

Similar to CPU operations, where there are a variety of vector shuffle instructions to exchange values between SIMD lanes, SIMD lanes in the APD 104 may also exchange data between threads (also referred to as intra-wave or intra-warp data exchange). In some embodiments, the APD 104 utilizes LDS for communication and data sharing between threads by writing thread data in registers to LDS memory to be accessed by other threads. In other embodiments, the APD 104 allows threads of a wavefront to exchange data with each other directly without going through shared LDS memory by performing register-to-register exchange between threads (i.e., threads transmit their register values directly to registers of other threads, such as by performing a store-and-load operation in a single step rather than separate store and load operations to pass data through shared memory). This register-to-register data exchange results in lower latency than shared memory access and does not consume shared memory space for data exchange, thereby allowing applications to rapidly interchange data among threads and leaves shared memory (e.g., LDS) available for other data. Register-to-register data exchange also reduces the amount of shared memory needed per thread block, since data exchanged at the wavefront level is not placed in shared memory.

Typical GPU programming languages are written from the perspective of a single thread. Some such languages allow specifying that a current thread should read a value from a specified different thread. The source code may be written such that the thread to be read from is computed from the current thread's ID. Additionally, various APDs 104 include hardware with functionality that accelerates certain patterns of thread data exchange. Accordingly, compilers convert source code (e.g., from a programmer's single thread view) by vectorizing scalar code to be implicitly distributed over multiple threads corresponding to SIMD lanes (e.g., taking a single instruction and applying that instruction to an array of data).

It can be difficult for a compiler to recognize an intended intra-wave data exchange pattern given the single thread perspective. Some compilers identify specific code language via pattern recognition to determine the programmer's intended intra-wave data exchange pattern. However, there are various methods of coding to generate the same result and looking at specific code language for pattern recognition does not reliably identify intended data exchange patterns. Other compilers define intrinsic functions (i.e., built-in function calls) that substitute a sequence of generated instructions (such as to implement vectorization and parallelization in languages which do not address such constructs) for the intrinsic function call. Such intrinsic functions explicitly convert source code for each defined intra-wave data exchange pattern. This requires an intrinsic function to be defined for each intra-wave data exchange pattern before then determining whether the intra-wave data exchange pattern is hardware-accelerated by a particular APD, which is often difficult when the source language is defined by a different entity than an entity associated with the compiler. Further, different APD architectures include different instruction set architectures (ISAs) regarding data exchange, specifications (e.g., built-in wavefront sizes), and run-time configurations—all of which impact communications patterns.

To address the effects of unreliably determining intended thread data interchange, the processing system 100 flexibly derives intended SIMD thread data exchange patterns at the compiler 120 by determining whether a data exchange pattern can be represented by a constant array and further determining what pattern of data exchange is represented by the relationship between the constants (as opposed to analyzing source code) before matching with available hardware-accelerated exchange patterns for a particular APD.

Figure 2:
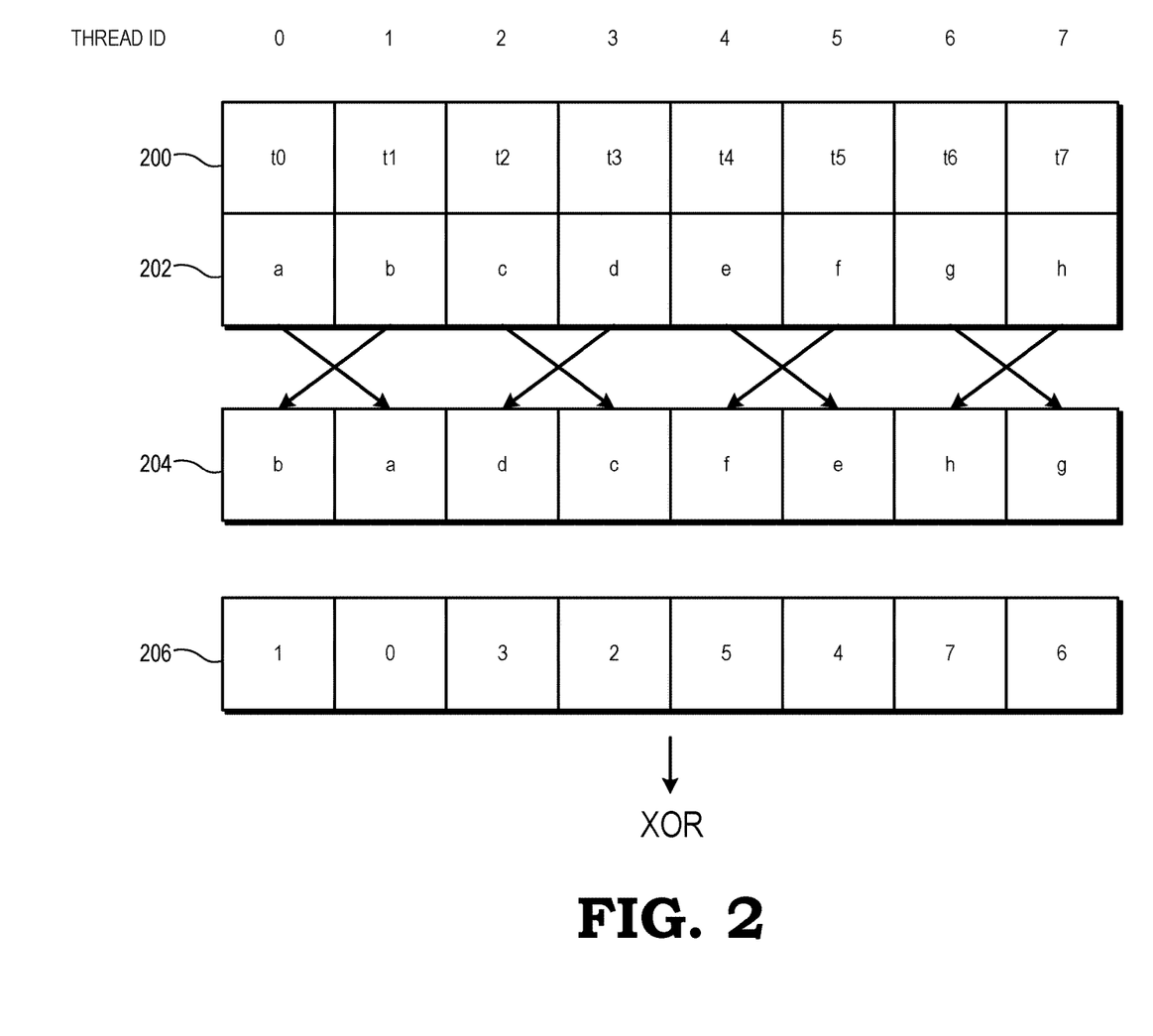
FIG. 2 is a diagram illustrating operations corresponding to the deriving of a first thread data exchange pattern in accordance with some embodiments.

FIG. 2 is a diagram illustrating operations corresponding to the deriving of a first intended thread data exchange pattern from source code in accordance with some embodiments. In various embodiments, the compiler 120 of the processing system 100 shown in FIG. 1 performs the operations described herein. As described in more detail above, the basic execution unit of an APD (e.g., APD 104 of FIG. 1) is a wavefront (e.g., a SIMD vector). The wavefront includes parallel elements (i.e., eight lanes as illustrated in FIG. 2 in the interest of brevity) that each represent a separate work-item (i.e., thread). As illustrated, a wavefront 200 includes eight threads (i.e., t0-t7) that concurrently perform the same instruction. In various embodiments, each thread in the wavefront 200 is assigned a unique thread identifier (hereinafter "thread ID") that is accessible to the thread during its execution. As illustrated in FIG. 2, the thread ID is a coordinate of a thread in the wavefront 200, with a constant value ranging from 0 to 7. The thread ID controls various aspects of a thread's processing behavior. For instance, a thread ID may be used to determine which portion of the input data set a thread is to process, to identify one or more other threads with which a given thread is to share an intermediate result, and/or to determine which portion of an output data set a thread is to produce or write.

Although described herein in the context of one-dimensional indexing such that if a wavefront includes some number n of threads, thread IDs are sequential index values ranging from 0 to n−1, it should be recognized that any unique identifier (including but not limited to numeric identifiers) can be used as a thread ID without departing from the scope of this disclosure. In some embodiments, one-dimensional indexing can make it more difficult to define data sharing patterns among the threads, particularly in applications where the data being processed corresponds to points in a multidimensional space. Accordingly, in other embodiments, thread IDs include multi-dimensional indices.

As shown, a mapping of the input lanes 202 (e.g., data associated with thread source registers) is compared to a mapping of the output lanes 204 (e.g., data associated with thread output registers) to generate a constant array 206 specifying the thread ID where each thread in wavefront 200 would like to read from. In particular, index position 0 in the constant array 206 corresponds to the location where thread t0 reads from (i.e., a constant value of 1 corresponding to thread ID 1) for this particular data exchange pattern. Index position 1 in the constant array 206 corresponds to the location where thread t1 reads from (i.e., a constant value of 0 corresponding to thread ID 0) for this particular data exchange pattern, and so forth. The constant array 206 is an array of n elements (here, n=8 corresponding to the number of lanes in the wavefront 200) with values {1,0,3,2,5,4,7,6}, respectively, for each index position of the constant array 206, which corresponds to a bitwise exclusive OR (XOR) of the thread ID for the shuffling of data between odd- and even-numbered lanes.

Figure 3:
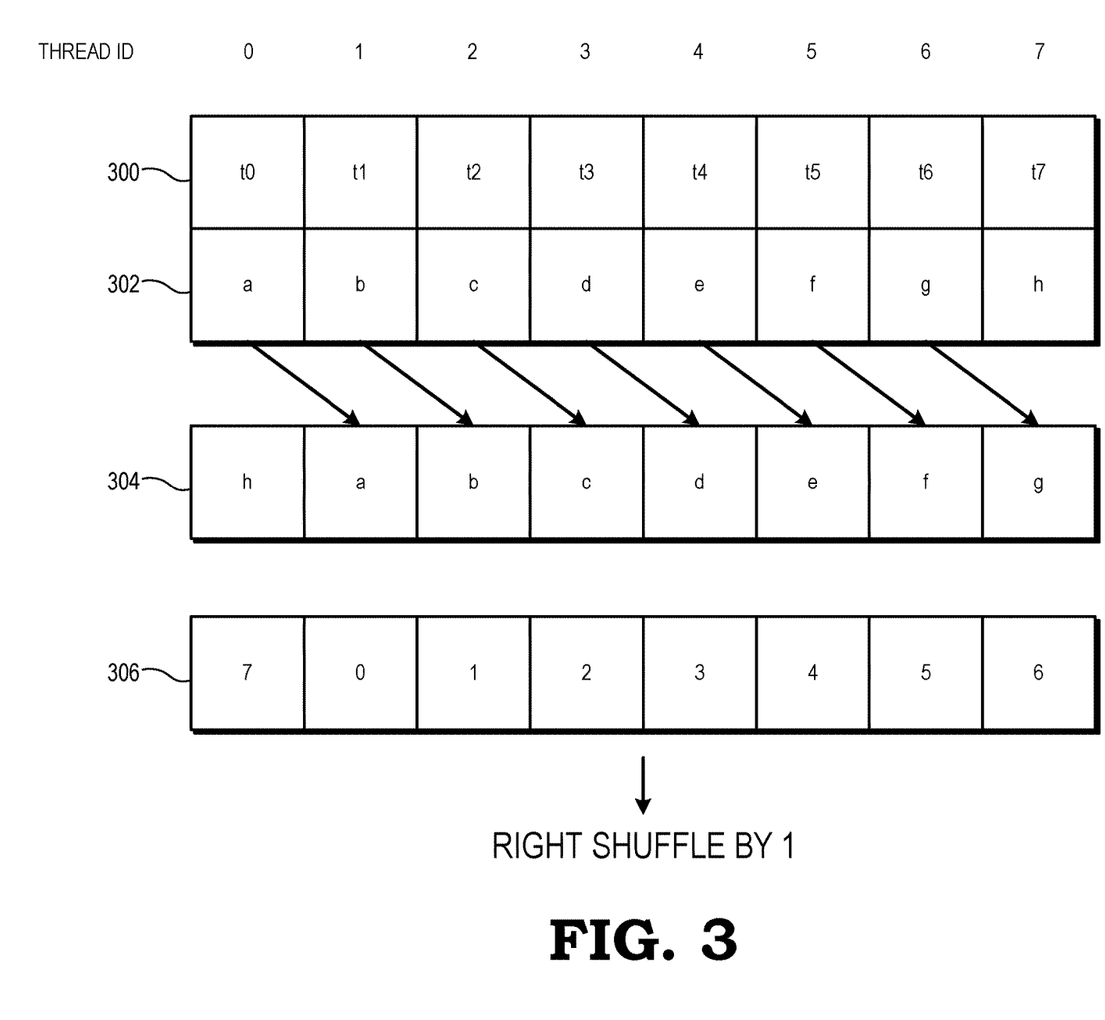
FIG. 3 is a diagram illustrating operations corresponding to the deriving of a second thread data exchange pattern in accordance with some embodiments.

FIG. 3 is a diagram illustrating operations corresponding to the deriving of a second intended thread data exchange pattern from source code in accordance with some embodiments. In various embodiments, the compiler 120 of the processing system 100 shown in FIG. 1 performs the operations described herein. As illustrated, a wavefront 300 includes eight threads (i.e., t0-t7) that concurrently perform the same instruction. In various embodiments, each thread in the wavefront 300 is assigned a unique thread identifier (hereinafter "thread ID") that is accessible to the thread during its execution. As illustrated in FIG. 3, the thread ID is a coordinate of a thread in the wavefront 300, with a constant value ranging from 0 to 7. The thread ID controls various aspects of a thread's processing behavior. For instance, a thread ID may be used to determine which portion of the input data set a thread is to process, to identify one or more other threads with which a given thread is to share an intermediate result, and/or to determine which portion of an output data set a thread is to produce or write.

As shown, a mapping of the input lanes 302 (e.g., data associated with thread source registers) is compared to a mapping of the output lanes 304 (e.g., data associated with thread output registers) to generate a constant array 306 specifying the thread ID where each thread in wavefront 300 would like to read from. In particular, index position 0 in the constant array 306 corresponds to the location where thread t0 reads from (i.e., a constant value of 7 corresponding to thread ID 7) for this particular data exchange pattern. Index position 1 in the constant array 306 corresponds to the location where thread t1 reads from (i.e., a constant value of 0 corresponding to thread ID 0) for this particular data exchange pattern. Index position 2 in the constant array 306 corresponds to the location where thread t2 reads from (i.e., a constant value of 1 corresponding to thread ID 1) for this particular data exchange pattern and so forth. The constant array 306 is an array of n elements (here, n=8 corresponding to the number of lanes in the wavefront 300) with values {7,0,1,2,3,4,5,6}, respectively, for each index position of the constant array 306, which corresponds to right shuffle of the thread ID by 1 (i.e., copy register value from a lane with thread ID lower by a value of 1).

Although FIGS. 2-3 describe thread data exchange pattern identification in the context of XOR and right shuffle, respectively, those skilled in the art will recognize that any data exchange pattern that folds down into an array of constants may be used to identify an intended data exchange pattern. For example, in various embodiments, other identifiable data exchange patterns may include, without limitation: shuffle left, direct copy from an indexed lane, quad permute, and the like.

Figure 4:
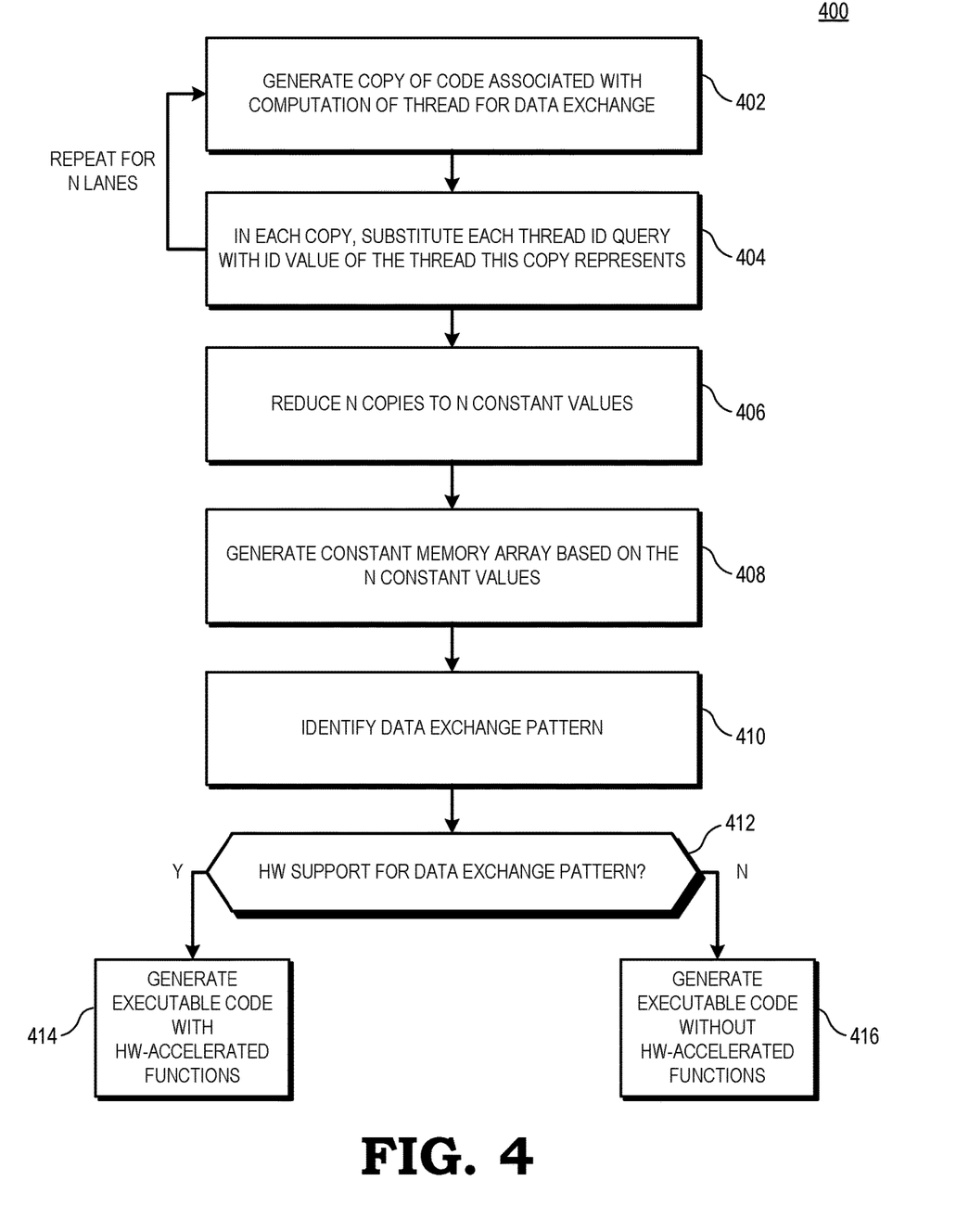
FIG. 4 is a flow diagram illustrating a method for deriving thread data exchange patterns in accordance with some embodiments.

FIG. 4 is a flow diagram illustrating a method 400 for deriving intended thread data exchange patterns from source code according to some embodiments. The method 400 is implemented in some embodiments at the compiler 120 of the processing system 100 as shown in FIG. 1. At block 402, the method 400 begins by generating a copy of code associated with computation of which thread to exchange data with. At block 404, the method 400 proceeds by substituting, in the copy, each thread ID query with the ID value of the thread this copy represents. The operations of block 402 and block 404 are repeated for n copies (e.g., n=8 as illustrated in FIGS. 2-3) of code for computing the thread to exchange data with. In various embodiments, the n copies correspond to the number of threads involved in data exchange in a wavefront (e.g., wavefront size for a particular hardware unit). Accordingly, a query using a function call for a thread ID (e.g., getLaneID function call according to various languages) would return a different number, as every lane of a wavefront performs the function call independently of other lanes.

The operations of block 404 include substituting, in each of the n copies, any use of a function call for a thread ID (e.g., getLaneID) with the actual thread ID of the thread that a particular copy represents. For example, each function call for the thread ID in the copy of code associated with a first copy (e.g., 1$^{st}$ of the n-th copies from blocks 402 and 404) is replaced with thread ID value=0, each function call for the thread ID in the copy of code associated with a second copy (e.g., 2$^{nd}$ of the n-th copies from blocks 402 and 404) is replaced with thread ID value=1, and so forth.

At block 406, the compiler 120 reduces then copies of code to n constant values (i.e., a constant value for each copy of code from blocks 402 and 404, representing the source thread ID of the thread that a particular n-th copy is to read data from). For example, as discussed in more detail with respect to FIG. 2, an XOR operation for lane 0 returns a source lane value of 1 such that the output from lane 0 after data exchange operations is read from input lane 1. Similarly, the XOR operation for lane 1 returns a source lane value of 0 such that the output from lane 1 after data exchange operations is read from input lane 0. The operations of block 406 include performing compiler optimizations such as constant folding and the like to attempt to reduce each copy to a single, constant value. For example, in various embodiments, each copy of code is reduced to a constant by computing a source lane value (i.e., a constant value) that identifies the thread location within the wavefront to read from for performing the pattern of data exchange for each of the number of copies of source code instructions.

At block 408, the method 400 proceeds by generating a constant array based on the n constant values computed at block 406. For example, as discussed in more detail with respect to FIG. 2, each element in the constant array 206 specifies a source lane to read from for data exchange. At block 410, a data exchange pattern is identified based on the constant values of the constant array. For example, as discussed in more detail with respect to FIG. 2, the constant array 206 with values {1,0,3,2,5,4,7,6} corresponds to a bitwise exclusive OR (XOR) of the thread ID for the shuffling of data between odd- and even-numbered lanes. Similarly, as discussed in more detail with respect to FIG. 3, constant array 306 with values {7,0,1,2,3,4,5,6} corresponds to right shuffle of the thread ID by 1.

At block 412, the identified data exchange pattern is compared to a set of hardware-accelerated exchange patterns supported by hardware accelerator(s) at a particular device. If the identified data exchange pattern matches one of the available hardware-accelerated exchange patterns, the compiler 120 generates executable code instructing hardware to perform a function corresponding to that data exchange at block 414. In some embodiments, the generated code includes a set of executable instructions with hardware-accelerated functions to instruct hardware to perform a function corresponding to the identified data exchange pattern. If the identified data exchange pattern is not hardware-accelerated on the particular device, the compiler generates program code without hardware-accelerated functions at block 416.

Figure 5:
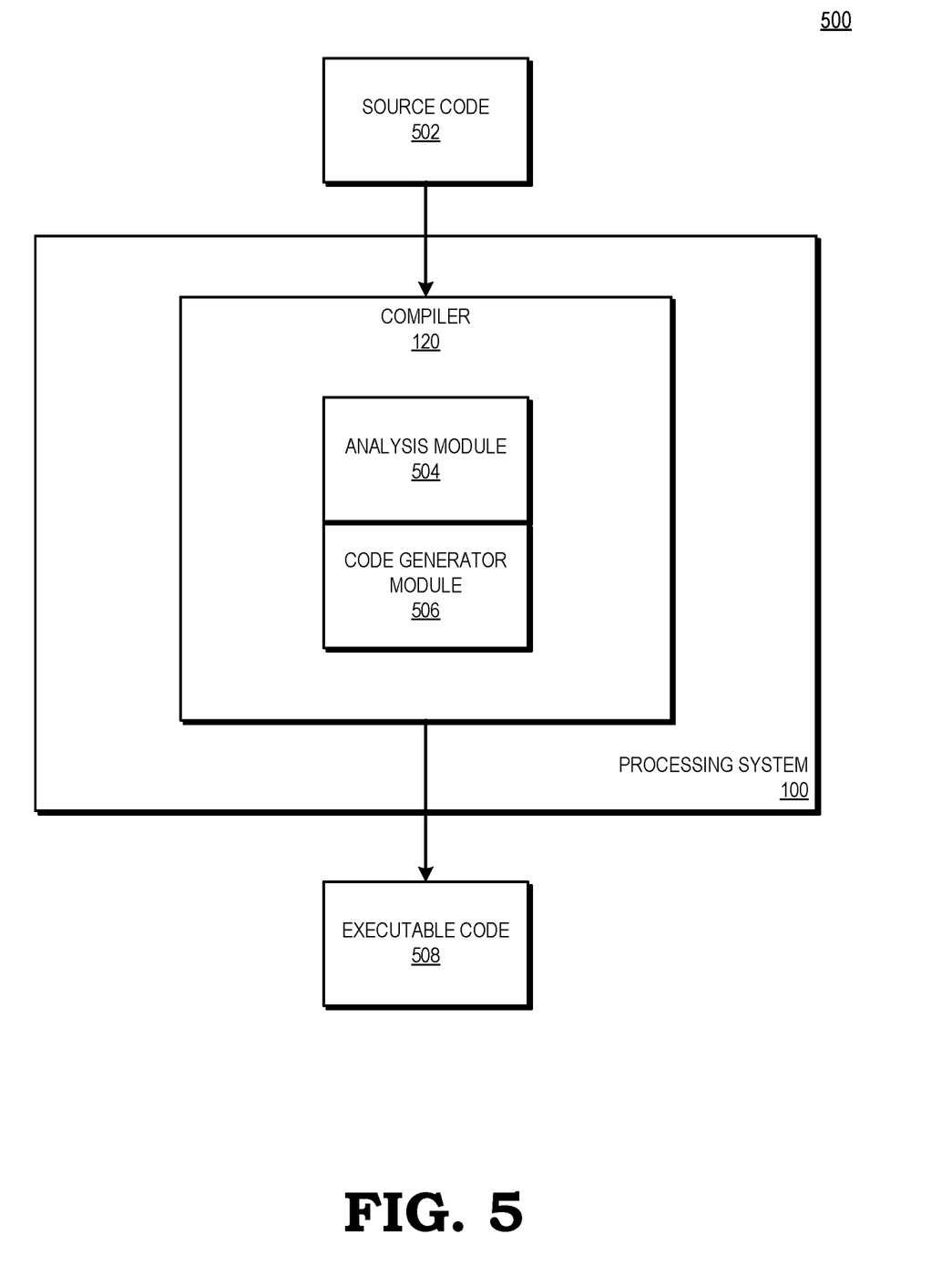
FIG. 5 is a block diagram illustrating a compiler for performing the operations of FIG. 4 in accordance with some embodiments.

FIG. 5 is a block diagram illustrating a compiler for performing the operations of FIG. 4 in accordance with some embodiments. The flow diagram of FIG. 4 may be executed by a compiler, such as the compiler 120 of FIG. 1. The compiler 120 runs on the processing system 100. In various embodiments, compiler 120 includes a software program executing on a computing system, with the type of computing system varying according to the implementation.

The compiler 120 includes an analysis module 502 to perform analysis, e.g., static analysis, on an instruction sequence (such as the source code 504) to identify a data exchange pattern and determine whether the identified data exchange pattern is supported by hardware accelerators in hardware on which compiled code is to be executed. The compiler 120 further includes a code generator module 506. Each of these modules represents hardware, software, or a combination thereof, to execute the operations as described herein. After the analysis module 502 finishes the analysis on the instruction sequence, the code generator module 506 compiles source code 502 to generate executable machine code (such as the compiled executable code 508 of FIG. 5) including code instructing hardware to perform a function corresponding to identified hardware-supported patterns of data exchange.

Different hardware devices often implement different hardware acceleration for different subsets of data exchange patterns. For example, a XOR that is supported by hardware on a first GPU may not be hardware-accelerated on a different, second GPU. Different hardware has different capabilities, but the deriving of thread data exchange patterns described herein is hardware agnostic. In this manner, the compiler 120 maps a single-threaded view of source code into a multi-threaded view to more reliably identify a pattern of data exchange intended to be coded into the source code and determine whether the identified data exchange pattern is hardware accelerated. Thus, the compiler 120 discovers thread data exchanges even though language is single thread view by identifying data exchange patterns and then determining whether hardware capabilities includes that data exchange pattern. For example, in various embodiments, the compiler 120 includes code that looks at constants produced (e.g., an array of 0-63 in wavefront that includes a collection of 64 or a proper number of work-items grouped for efficient processing at compute units with each wavefront sharing a single program counter) and determines what pattern is represented. If the data exchange pattern folds down to a constant, relationships can be determined (e.g., XOR pattern of swapping odd/even numbered threads, thread rotation, quad permute, and the like), which is easier than analyzing low-level GPU language to determine intent.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   identifying, based on a constant array, a pattern of data exchange between a plurality of threads in a wavefront, wherein the constant array comprises an array of source lane values; and
   generating a set of executable instructions to perform a hardware-accelerated exchange pattern at one or more of a plurality of processor cores in response to determining, based on the constant array, that the pattern of data exchange is a hardware-accelerated exchange pattern executable at the one or more of the plurality of processor cores.

2. The method of claim 1, further comprising:
   generating a number of copies of source code instructions associated with data exchange in the wavefront;
   substituting, in each one of the number of copies, a thread identifier query with a thread identifier value that identifies a thread location within the wavefront; and
   computing a source lane value for each of the number of copies of source code instructions, wherein the source lane value is a constant that identifies the thread location within the wavefront to read from for performing the pattern of data exchange.

3. The method of claim 2, further comprising:
   generating the constant array based on the source lane value for each of the number of copies of source code instructions.

4. The method of claim 1, wherein determining that the pattern of data exchange is a hardware-accelerated exchange pattern comprises:
   matching the identified pattern of data exchange to one of a set of hardware-accelerated data exchange patterns supported by the one or more of the plurality of processor cores.

5. The method of claim 1, wherein generating the set of executable instructions comprises:
   executing a compiler that, when executed, replaces a set of source code instructions with one or more hardware-accelerated functions to perform the hardware-accelerated exchange pattern.

6. The method of claim 1, wherein determining the pattern of data exchange comprises:
   comparing a first mapping for each of a plurality of input lanes of the wavefront to a second mapping for each of a plurality of output lanes of the wavefront.

7. The method of claim 1, wherein each element of the array of source lane values stores a constant identifying a thread location within the wavefront to read from for performing the pattern of data exchange.

8. An apparatus comprising:
   a plurality of processor cores configured to execute a wavefront comprising a plurality of threads; and
   a memory coupled to the plurality of processor cores, wherein the memory comprises a compiler to generate instructions that, when executed by the plurality of processor cores, cause the plurality of processor cores to:
      identify, based on a constant array, a pattern of data exchange between the plurality of threads in the wavefront;
      determine, based on the constant array, that the pattern of data exchange is a hardware-accelerated exchange pattern executable at one or more of the plurality of processor cores; and
      generate a set of executable instructions to perform the hardware-accelerated exchange pattern at the one or more of the plurality of processor cores.

9. The apparatus of claim 8, wherein the compiler further comprises:
   an analysis module configured to generate a number of copies of source code instructions associated with data exchange in the wavefront.

10. The apparatus of claim 9, wherein the analysis module is further configured to generate the constant array based on a source lane value for each of the number of copies of source code instructions.

11. The apparatus of claim 9, wherein the analysis module is further configured to compute a source lane value for each of the number of copies of source code instructions, wherein the source lane value is a constant corresponding to a thread identifier that identifies a thread location within the wavefront to read from for performing the pattern of data exchange.

12. The apparatus of claim 9, wherein the analysis module is further configured to match the identified pattern of data exchange to one of a set of hardware-accelerated data exchange patterns supported by the one or more of the plurality of processor cores.

13. The apparatus of claim 9, wherein the analysis module is further configured to compare a first mapping for each of a plurality of input lanes of the wavefront to a second mapping for each of a plurality of output lanes of the wavefront.

14. The apparatus of claim 8, wherein the compiler further comprises:
a code generator module configured to replace a set of source code instructions with one or more hardware-accelerated functions to perform the hardware-accelerated exchange pattern.

15. A computer-readable storage medium storing instructions that, when executed by a processor, cause a processing system to perform the steps of:
identifying, based on a constant array, a pattern of data exchange between a plurality of threads in a wavefront, wherein the constant array comprises an array of source lane values;
determining, based on the constant array, that the pattern of data exchange is a hardware-accelerated exchange pattern executable at one or more of a plurality of processor cores; and
generating a set of executable instructions to perform the hardware-accelerated exchange pattern at the one or more of the plurality of processor cores.

16. The computer-readable storage medium of claim 15, further comprising instructions that, when executed by the processor, perform the steps of:
generating a number of copies of source code instructions associated with data exchange in the wavefront.

17. The computer-readable storage medium of claim 16, further comprising instructions that, when executed by the processor, perform the steps of:
computing a source lane value for each of the number of copies of source code instructions, wherein the source lane value is a constant corresponding to a thread identifier that identifies a thread location within the wavefront to read from for performing the pattern of data exchange.

18. The computer-readable storage medium of claim 17, further comprising instructions that, when executed by the processor, perform the steps of:
generating the constant array based on the source lane value for each of the number of copies of source code instructions.

19. The computer-readable storage medium of claim 16, further comprising instructions that, when executed by the processor, perform the steps of:
matching the identified pattern of data exchange to one of a set of hardware-accelerated data exchange patterns supported by the one or more of the plurality of processor cores.

20. The computer-readable storage medium of claim 16, further comprising instructions that, when executed by the processor, perform the steps of:
executing a compiler that replaces a set of source code instructions with one or more hardware-accelerated functions to perform the hardware-accelerated exchange pattern.

* * * * *